US007117115B2

(12) United States Patent
Beignon et al.

(10) Patent No.: US 7,117,115 B2
(45) Date of Patent: Oct. 3, 2006

(54) THREE-DIMENSIONAL MACHINE WITH SIMULTANEOUS MEASUREMENTS

(75) Inventors: Dominique Maurice Gerard Beignon, Herblay (FR); Pascal Desire Jacques Choquet, Gargenville (FR); Joel Gandubert, Surtainville (FR); Jean-Jacques Levy, Paris (FR)

(73) Assignee: Snecma Moteurs, Paris (FR)

( * ) Notice: Subject to any disclaimer, the term of this patent is extended or adjusted under 35 U.S.C. 154(b) by 0 days.

(21) Appl. No.: 11/124,085

(22) Filed: May 9, 2005

(65) Prior Publication Data

US 2005/0256674 A1   Nov. 17, 2005

(30) Foreign Application Priority Data

May 12, 2004   (FR)   ................... 04 05141

(51) Int. Cl.
*G01C 9/00*   (2006.01)
*G06F 15/00*   (2006.01)

(52) U.S. Cl. .................................... 702/152
(58) Field of Classification Search ................ 702/94, 702/95, 150–154
See application file for complete search history.

(56) References Cited

U.S. PATENT DOCUMENTS 4,298,874 A  *  11/1981  Kuipers .................... 342/463

FOREIGN PATENT DOCUMENTS

EP         1 596 156    *  11/2005

OTHER PUBLICATIONS

English translation of Jean-Francois Peyrucat, "Faster Dimensional Control", Dimensional Measurements, SOLUTIONS, XP-000773067, pp. 1-6, previously cited May 9, 2005.

* cited by examiner

*Primary Examiner*—Michael Nghiem
(74) *Attorney, Agent, or Firm*—Oblon, Spivak, McClelland, Maier & Neustadt, P.C.

(57) ABSTRACT

A method for three-dimensional measurement of coordinates of a set of N predetermined points of the surface of a mechanical part to be measured, relatively to a predetermined reference system, and the direction cosines of the theoretical normals thereto at the theoretical points corresponding to the N predetermined points are known, and including a preparatory phase, in which the coordinate points, corresponding to the N predetermined points of a first mechanical part taken as a standard part, are measured; an initialization phase, in which displacement measurements (along the normals are read on the N points of the standard part; a measurement phase, in which N linear displacement measurements performed on the N points of the part to be measured corresponding to the N points of the standard part, are read; and a computation phase, in which the coordinates of the N points of the part to be measured are computed.

10 Claims, 4 Drawing Sheets

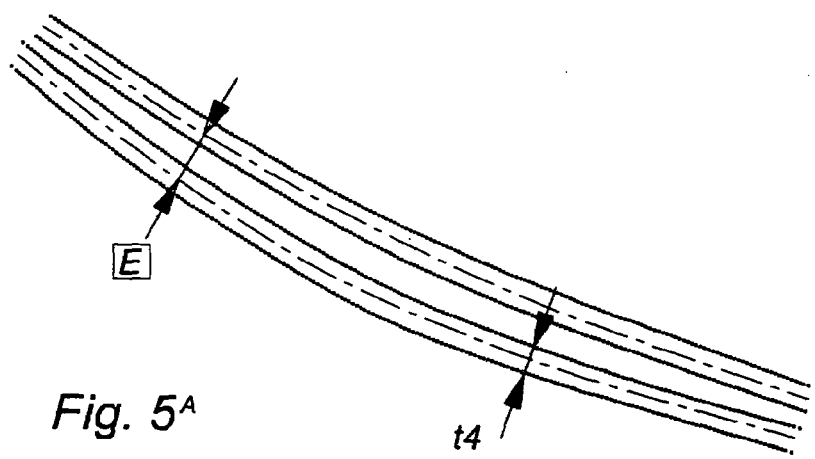
*Fig. 5<sup>A</sup>*
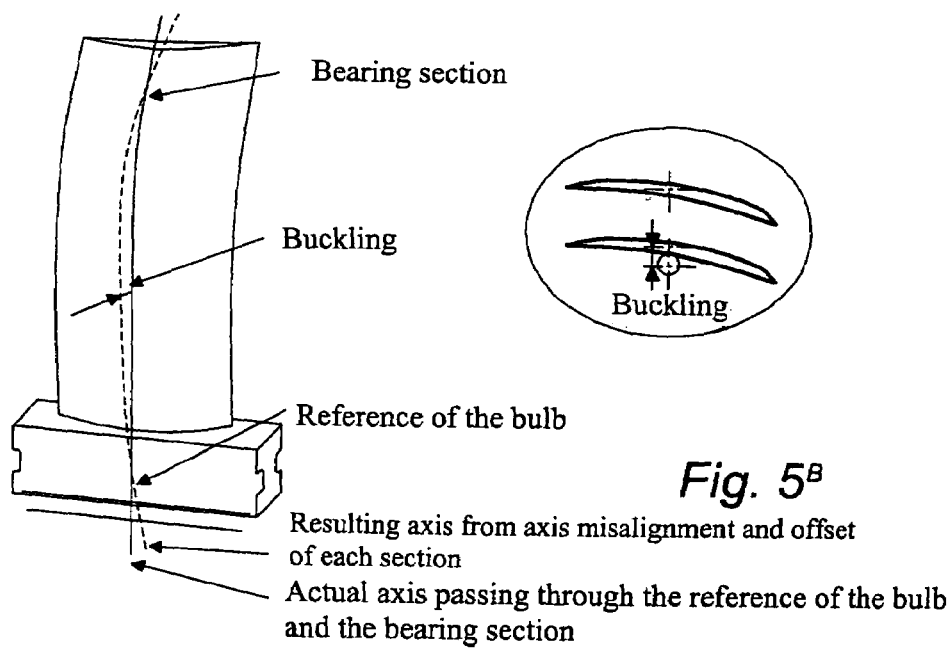
*Fig. 5<sup>B</sup>*
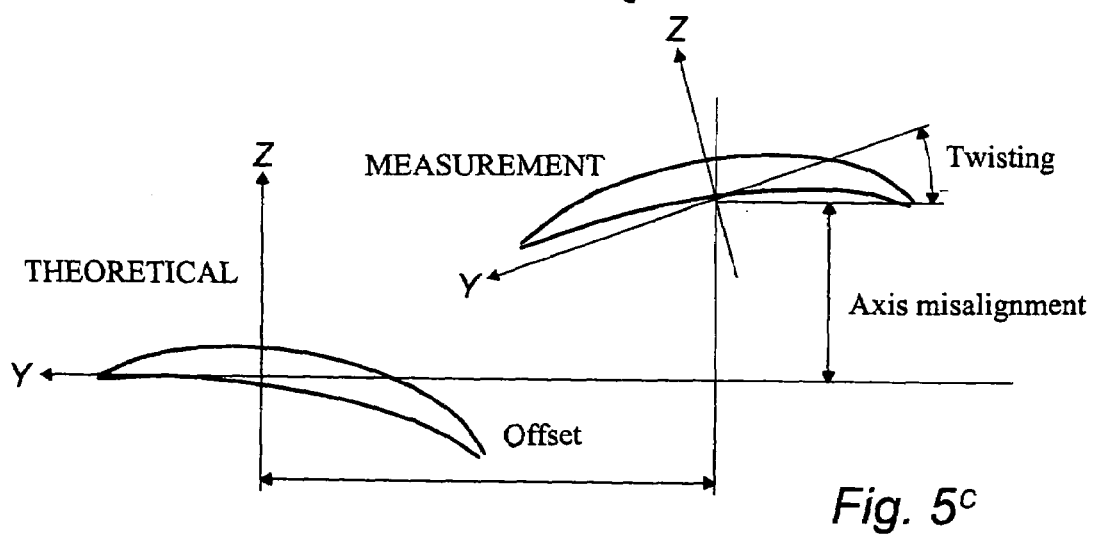
*Fig. 5<sup>C</sup>*

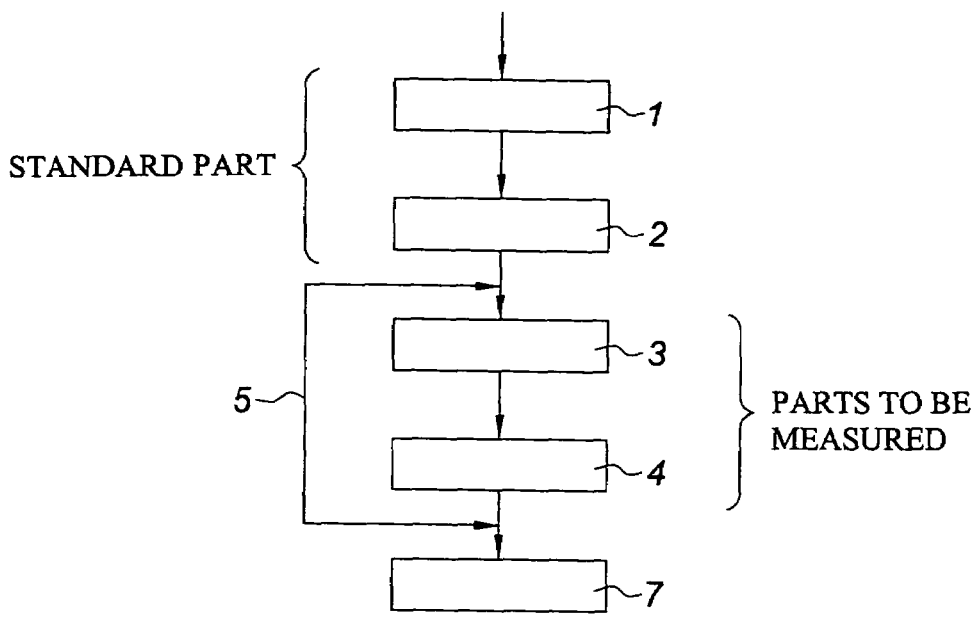
Fig. 6
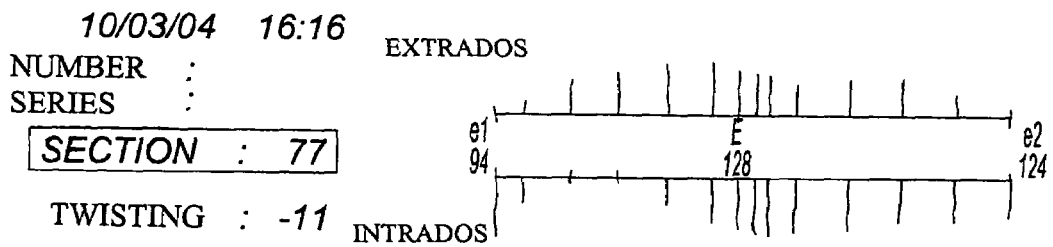
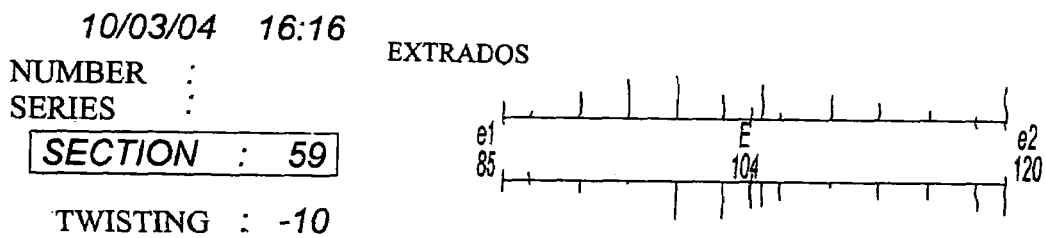
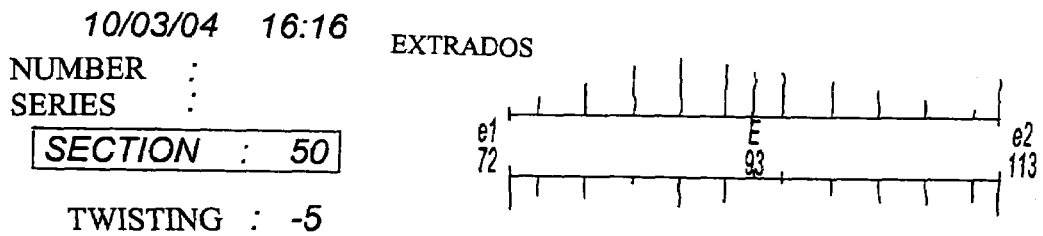
Fig. 7

THREE-DIMENSIONAL MACHINE WITH SIMULTANEOUS MEASUREMENTS

BACKGROUND OF THE INVENTION

1. Field of the Invention

The present invention relates to three-dimensional measuring machines (3D CMMs) used in metrology for measuring precision mechanical parts.

2. Description of the Related Art

These machines include a numerical control system of the type fitting out numerical control machine-tools (NCMTs), for numerically controlling a jointed arm. The arm bears a comparator and a feeler which is put into contact onto points of the surface to be measured, thereby located in a rectangular coordinate system of the theoretical reference system, or of the machine.

In order to perform the measurement or the inspection of a part; it is clamped on the measurement platen fitting out the CMM, and this accurately with respect to the machine or mechanical reference system. This reference system is embodied by a device of the platen, for example a reference surface, sphere or other surface, on which, during an initialization phase of the machine, the machine reference system is made to coincide with the reference system of the part to be measured before making it perform the measurements.

The feeler is then automatically and successively positioned by the machine on the points to be measured, and an operator simultaneously and manually notes down on the comparator the corresponding deviations with respect to the theoretical coordinates of these points.

This method is well suited for simple inspections of not very complex parts, when there are a few points to be checked or measured and when the number of parts to be measured is not too large.

However for complex parts such as blades of turbine engines, measurements are lengthy and the number of parts to be measured is significant. In this case, the method proves to be very costly.

SUMMARY OF THE INVENTION

It is with the goal of reducing these costs that the applicant has achieved her invention.

For this purpose, first of all, the invention relates to a method for the three-dimensional measurement of coordinates of a set of N predetermined points of the surface of a mechanical part to be measured relatively to a determined reference system, and the direction cosines of the theoretical normals thereto are known at theoretical points corresponding to said N predetermined points, and including:

- a preparatory phase, in which the coordinates of N points corresponding to said N predetermined points of the surface of a first mechanical part taken as a standard part, are measured, relatively to the predetermined reference system,
- an initialization phase, in which N linear displacement measurements along said normals, are simultaneously and respectively read on said N points of said standard part,
- a measuring phase, in which N linear displacement measurements simultaneously and respectively performed on said N points of the part to be measured corresponding to the N points of said standard parts, are read,
- a computing phase, in which the three-dimensional coordinates of the N points of the part to be measured are computed from the three-dimensional coordinates of the N points of said standard part, from linear measurements, and from the direction cosines of the N theoretical normals at these points.

At each point, the measurement is performed linearly, according to the theoretical normal to the surface, by an individual relative displacement sensor, at the point, which is initialized beforehand, separately from the other sensors, but simultaneously with them, by means of a standard part on which measurements have already been performed by the known means of the prior art mentioned above.

The N points to be measured are thereby measured simultaneously and automatically.

The invention also relates to a three-dimensional machine with simultaneous measurements for applying the method above, including a computing module, a control module and a measuring platen characterized by the fact that it includes at least one array of displacement sensors arranged so that in an open position, a part may be mounted on the platen, and in a closed position, all the sensors are put in operational contact for measuring the part.

Preferably, the machine includes at least two arrays of sensors positioned facing each other to surround the standard part or the part to be measured. Hence, both faces of a part may be measured simultaneously and the thicknesses of the part may be measured easily.

Advantageously, the displacement sensors are inductive sensors, which are rugged sensors well adapted to the industrial environment.

Still advantageously, the computing module is arranged in order to compute the global geometrical characteristics of the surface of the part, for example thicknesses, twisting, buckling, offset or axis misalignment.

BRIEF DESCRIPTION OF THE DRAWINGS

The invention will be better understood with the help of the following description of the three-dimensional machine with simultaneous measurements and of the inventive method for simultaneous measurements, with reference to the appended drawing, wherein:

FIGS. 5 show diagrams explaining a few global geometrical characteristics computed by the computing module of the invention, FIG. 6 illustrates an operational block diagram of the computing module, and FIG. 7 shows an example of results of computations provided by the computing module of the system of the invention.

DETAILED DESCRIPTION OF THE PREFERRED EMBODIMENTS

Figure 1:
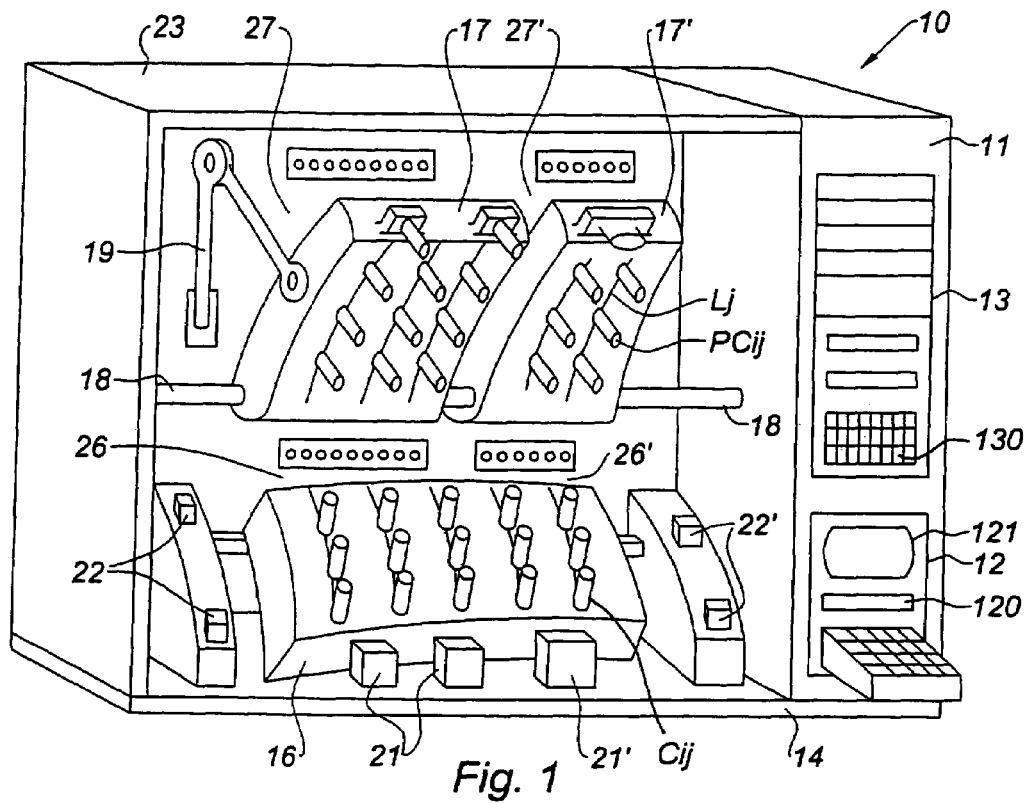
FIG. 1 illustrates a perspective view of the machine according to the invention, in the open or mounting position.
Figure 3:
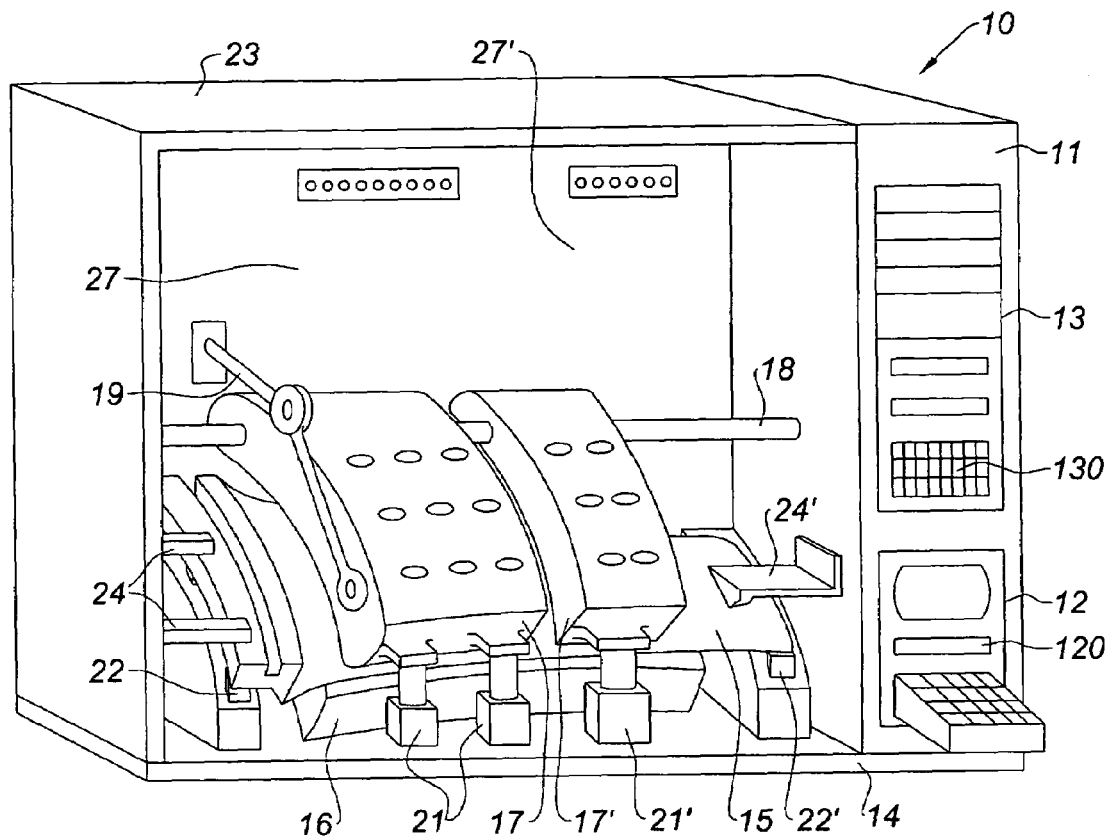
FIG. 3 illustrates a perspective view of the machine according to the invention in the closed or measuring position.

With reference to FIGS. 1 and 3, the three-dimensional machine 10 with simultaneous measurements primarily includes, assembled on a frame 23, an electronic system 11 fitted out with a computing module 12 as explained in the following, with a numerical control module 13, with a measurement platen 14 for receiving a mechanical part 15 and measurement means 16, 17, 17', explained hereafter.

The part 15, either one from a first mechanical part taken as a standard part, designated by standard part, or one from a mechanical part to be measured, is clamped by clamps 24, 24', on shims 22, 22', on either side of the measurement platen 14.

The above measurement means appear under the aspect of arrays (i, j) with i=1, ..., n and j=1, ..., m, of relative displacement sensors Cij supported by jaws, here in the example of the drawing, a lower jaw 16 fixed to the frame 23 and two upper jaws 17 and 17' which may pivot around an axis 18 integral with the frame 23. The sensors Cij are aligned along lines Lj of arrays 16, 17, 17', corresponding to section profiles j of part 15.

The numerical control module 13 may control via a console 130 of the module 13, actuators 19 arranged for positioning the upper jaws 17 and 17' either in an open or mounting position as in FIG. 1, and allowing the part 15 to be mounted beforehand on the measurement platine 14, or in a closed or measurement position and bringing these jaws 17, 17' into abutment on adjustable stops 21, 21', as shown in FIG. 3.

The shape of the arrays 16, 17, 17', the position of the sensors Cij on the arrays and the height of the stops 21, 21', are dimensioned so as, in the measuring position, to put all the feelers PCij of the relative displacement sensors Cij in operational contact as explained hereafter on the faces, one being the lower face and the other the upper face of part 15 mounted on the platen 14.

Both faces of a part 15 such as a turbine engine blade, which are designated by the terms intrados and extrados, may thereby be measured simultaneously and give rise to global measurements as this will be explained later on.

Figure 2:
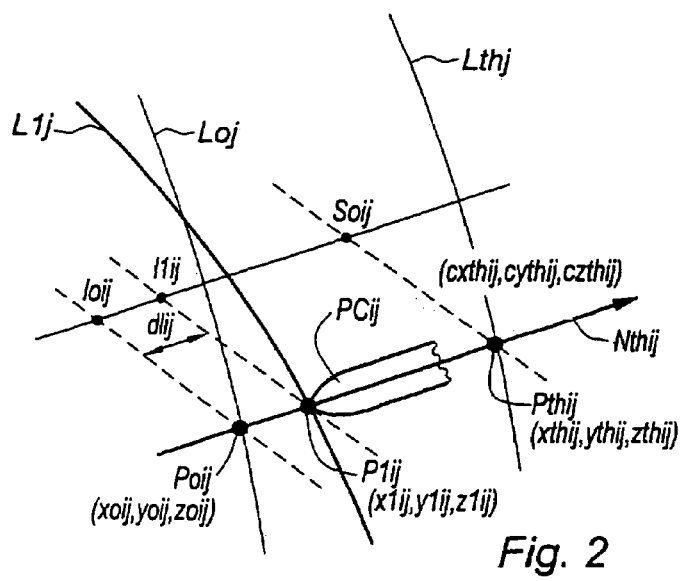
FIG. 2 illustrates a diagram explaining the double measurement principle performed by means of a displacement sensor and of a standard part.
Figure 4:
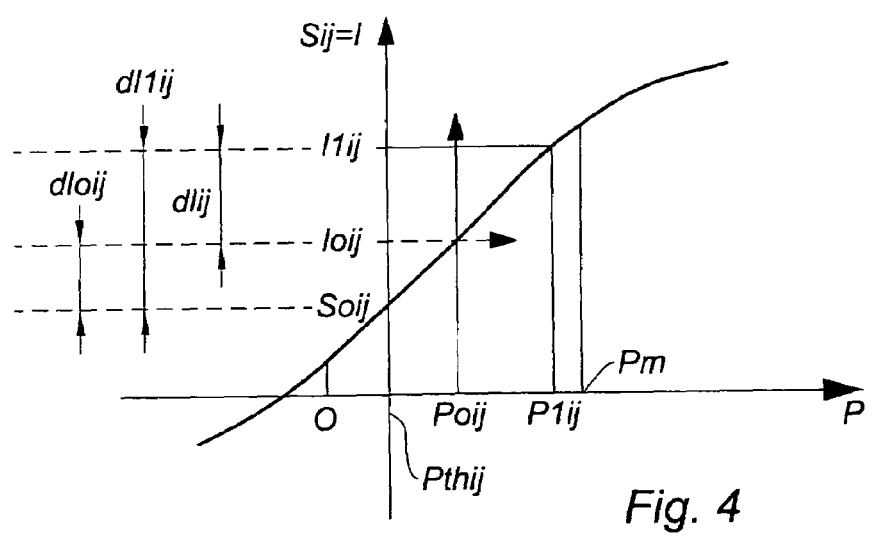
FIG. 4 illustrates a diagram showing the characteristic response of an inductive sensor.

Here, the displacement sensors Cij, with reference to FIGS. 2 and 4, are inductive sensors each including a feeler PCij. In response to a position Poi or Pli of the feeler of the line Loj or Llj, corresponding to a line Lj of an array 16, 17 or 17', they deliver measurement electric signals Sij for each face of the part 15, here analog electric currents induced by a magnetized core in a conducting coil, which are transmitted to the computing module 12 via flexible connections 26, 26', 27, 27' from the arrays 16, 17 and 17'.

By operational contact, with reference to FIG. 4, it is to be understood that the position P of the feeler of the sensor, which is integral with its core, should be between two extreme positions O and Pm on the outside of which the induced current I response is no longer linear.

It should also be understood that the axis of the feeler PCij should be substantially orthogonal to the measured surface when it is in contact with it, in order to avoid seizures, or premature wear, and to simplify the computations for interpreting the measurement.

For this, one resorts to the theoretical definition of the surface, derived from computer aided design (CAD) as known from the prior art, and available here as computer files with the CATIA format (the CAD software distributed by EMD complies with this). These files may be read on a compact disk CD by a CD reader-recorder 120 of the computing module 12.

By means of the module 12 and the CAD files for part 15, the computing module 12 computes the theoretical sections bearing the desired lines Lj on arrays 16, 17, 17', the theoretical points Pthij of these lines where measurements are desired, and the direction cosines cxthij, cythij, ezthij of the normals Nthij to the theoretical surface at these points Pthij. These theoretical data DT are kept in memory or written on a CD file by the reader-recorder 120.

The theoretical data DT are required for producing arrays 16, 17, 17' as they allow localization of the position of the sensors Cij and the inclination, in which the sensors Cij ought to be for performing the measurements, therefore allow the arrays to be laid out properly so that all the respective feelers Pcij of the displacement sensors Cij may be in operational contact in the measurement position. Insofar their being complicated, all these computations and the making of arrays 16, 17, 17' require expertise which however only belongs to the prior art.

To perform an accurate mapping of a complex part surface such as a turbine engine blade, the above machine should be used according to a special multiple three-dimensional double measurement method using a first mechanical part taken as a standard which will now be described with reference to FIG. 6.

During a preparatory phase 1, the coordinates xoij, yoij, zoij of the N=m.n points Poij on the lines Loj corresponding to lines Lj and to the positions of the sensors Cij on these lines, of the surface of the first mechanical part taken as a standard part relatively to a predetermined Ro reference system, for example by using a 3D CMM machine according to the method from the prior art explained at the beginning of this document.

The direction cosines cxthij, cythij, czthij of the theoretical normals Nthij to said surface at theoretical points Pthij derived from the data DT and corresponding to the points Poij are stored in the computing module 12. These normals define N linear theoretical reference systems (Pthij, Nthij), with origin Pthij, and unit vector Nthij, respectively attached to the N points Pthij, considering that at Pthij, the sensors Cij give a constant but unknown signal Soij.

During an initialization phase 2 of the method, the standard part is positioned on the measurement platen 14 of the machine, the closing of the arrays 17 and 17' is controlled by the closing control accessible on the console 130, and N linear measurements loij simultaneously and respectively performed on said N points Poij of the standard part in each of the N linear theoretical reference systems are read from sensors Cij, and these N loij coordinates are stored in the computing module 12.

It should noted that for two different sensors Cij, the Soij quantities are different. As the absolute measurement loij is such that:

$$loij = Soij + dloij,$$

it is seen that measurements loij of the part are not performed relatively to identical origins from one sensor to the other, and therefore they cannot be used for reconstructing the Lj profile of the surface of the part.

During a subsequent measurement phase 3, the standard part is replaced with the part to be measured in the machine 10, by using the console 130 and the control for opening and closing the arrays 17 and 17', and N linear measurements llij simultaneously and respectively performed on said N points Plij of the part to be measured in each of the N linear theoretical reference systems are read from the same sensors Cij, and these N coordinates llij are stored in the computing module 12.

The remark made earlier concerning loij also applies to llij here.

Finally, during a subsequent phase 4 for computing the coordinates, the computing module 12 computes the three-dimensional coordinates xlij, ylij, zlij, of the part to be measured from the three-dimensional coordinates xoij, yoij, zoij, of the standard part, from the measurements loij and llij and from the direction cosines cxthij, cythij, czthij, by using the relation inferred from FIG. 2:

$$xlij = xoij - cxthij * dlij$$

with $dlij = (dllij + Soij) - (dloij + Soij) = llij - loij$.

The other coordinates are obtained in the same way:

$$ylij = yoij - cythij * dlij$$

$$slij = zoij - czthij * dlij$$

By these computations, the reconstruction of the profile of the sections of the part to be measured is made possible and is sufficiently accurate, at least for applying the method to blades of turbine engines, as accuracies for reconstructing the profile of the order of one hundredth of a millimeter in the Ro reference system are achieved.

To measure another part, it is unnecessary to carry out the initialization phase again: its results remain available in the computing module for a whole series of parts to be measured, insofar that this is required.

The part which has just been measured is merely replaced with a new part, and via connection 5, the measurement 3 and computing 4 phases are reinitiated in order to obtain the coordinates xlij, ylij, zlij of this new part.

When all the parts to be measured have been processed, complementary computations of geometrical characteristics may be performed during a phase 7 for global computations, but these computations may also take place during the phase 4 for computing the coordinates, to the extent that no statistical evaluations are made on the whole set of parts measured in this way.

With reference to FIGS. $5^A$, $5^B$, $5^C$, and 7, during this phase, the computing module 12 may compute global geometrical characteristics of the sections or profiles j of the surface of the part, for example, the thicknesses as shown in FIG. $5^A$, buckling as shown in FIG. $5^B$, twisting, offset, axis misalignment, as shown in FIG. $5^C$.

All these computation results from module 12 may be displayed on a screen 121 or printed out by means of a printer not shown.

An exemplary output of results of twisting on the printer is shown in FIG. 7.

The invention claimed is:

1. A method for the three-dimensional measurement of coordinates (xli, yli, zli) of a set of N predetermined points (Plij) of the surface of a mechanical part to be measured relatively to a predetermined reference system (Ro) and in which the direction cosines (cxthij, cythij, czthij) of the theoretical normals (Nthij) thereto are known at the theoretical points (Pthij) corresponding to said N predetermined points (Plij), and including:

a preparatory phase, in which the coordinates (xoij, yoij, zoij) of N points (Poij), corresponding to said N predetermined points (Plij) of the surface of a first mechanical part taken as a standard part, are measured relatively to the reference system (Ro) and stored;

an initialization phase, wherein N linear displacement measurements (loij) along said normals (Nthij) are simultaneously and respectively read on said N points (Poij) of said standard part and stored;

a measurement phase, wherein N linear displacement measurements (llij), simultaneously and respectively performed on said N points (Plij) of the part to be measured, corresponding to the N points (Poij) of said standard part, are read and stored;

a computation phase, in which the three-dimensional coordinates (xlij, ylij, zlij) of the N points of the part to be measured are computed from the three-dimensional coordinates (xoij, yoij, zoij) of the N points of said standard part, from the linear measurements (loij, llij) and from the direction cosines (cxthij, cythij, czthij) of the N theoretical normals at these points, said computed three dimension coordinates being stored, displayed or printed.

2. The method according to claim 1, wherein at each point, the measurement is linearly performed along the theoretical normal by an individual relative displacement sensor (Cij) at the point.

3. The method according to claim 2, wherein each sensor (Cij) measurement is initialized beforehand, separately from that of the other sensors, but simultaneously with them.

4. The method according to claim 3, wherein the sensors (Cij) are inductive sensors.

5. The method according to claim 1, wherein the three-dimensional coordinates (xoij, yoij, zoij) of the N points of the standard part are measured by means of a 3D CMM.

6. A three-dimensional machine with simultaneous measurements for applying the method according to any of claims 1 to 5, including a computing module, a control module and a measurement platen, wherein said machine includes at least one array of displacement sensors (Cij) arranged, in an open position, so as to allow a part to be mounted on the platen, and in a closed position, to put all the sensors (Cij) in operational contact for measuring the part.

7. The machine according to claim 6, wherein said machine includes at least two arrays of arrays (Cij) positioned facing each other to surround the part.

8. The machine according to claim 6, wherein the displacement sensors are inductive sensors.

9. The machine according to claim 6, wherein the computing module is arranged so as to compute the overall geometrical characteristics of the surface of the part.

10. The machine according to claim 6, wherein said machine is configured to reconstruct profiles of blades from turbine engines.

* * * * *